US009152353B1

(12) United States Patent
Wang et al.

(10) Patent No.: US 9,152,353 B1
(45) Date of Patent: Oct. 6, 2015

(54) VERIFYING THE CONSISTENCY OF SLICE ALLOCATION METADATA

(71) Applicant: EMC Corporation, Hopkinton, MA (US)

(72) Inventors: Pu Wang, Shanghai (CN); Kent J. Costa, Cary, NC (US); Kenny Zhou, Shanghai (CN); Hansi Wu, Shanghai (CN); Chuangxian Wei, Shanghai (CN); Qi Mao, Shanghai (CN); Ye Zhang, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 147 days.

(21) Appl. No.: 14/041,217

(22) Filed: Sep. 30, 2013

(51) Int. Cl.
*G06F 5/00* (2006.01)
*G06F 3/06* (2006.01)
*G06F 11/14* (2006.01)

(52) U.S. Cl.
CPC ............ *G06F 3/0689* (2013.01); *G06F 3/0619* (2013.01); *G06F 3/0665* (2013.01); *G06F 11/1435* (2013.01)

(58) Field of Classification Search
None
See application file for complete search history.

(56) References Cited

U.S. PATENT DOCUMENTS 8,037,345 B1 * 10/2011 Iyer et al. ..................... 714/6.12
8,886,611 B2 * 11/2014 Caputo ......................... 707/681

* cited by examiner

*Primary Examiner* — Idriss N Alrobaye
*Assistant Examiner* — Richard B Franklin
(74) *Attorney, Agent, or Firm* — BainwoodHuang

(57) ABSTRACT

A technique for verifying the consistency of slice allocation metadata includes accessing, from user space of an operating system running on the data storage apparatus, a set of drivers running in kernel space of the operating system to obtain slice allocation metadata from the set of drivers, and identifying discrepancies in slice allocation metadata returned from the set of drivers on a per-file-system basis.

20 Claims, 6 Drawing Sheets

VERIFYING THE CONSISTENCY OF SLICE ALLOCATION METADATA

BACKGROUND

Data storage systems are arrangements of hardware and software that include storage processors coupled to arrays of non-volatile storage devices. In typical operation, the storage processors service storage requests that arrive from users. The storage requests specify data elements in the arrays of non-volatile storage devices to be written, read, created, or deleted, for example.

Data storage systems typically allocate non-volatile storage in increments known as "slices." Slices are derived from the arrays of non-volatile storage devices and provide building blocks from which user objects may be composed. "User objects" include LUNs (logical storage units), file systems, and vVOLs (virtual volumes), for example. Some data storage systems provide slices in fixed-sized increments, such as 1 GB or 256 MB, whereas others provide slices in variable sizes.

Data storage systems typically maintain metadata for tracking slice allocation. In some systems, different drivers running on the data storage systems maintain different views of slice allocation metadata. For example, as users change data on a data storage system or as the system reorganizes user data on different storage devices, the drivers update their respective views of slice allocation metadata to reflect changes.

Sometimes, slice allocation metadata can become corrupted. Corruption can result from software errors or hardware errors, for example, and can cause slice allocation metadata as maintained by different drivers to conflict. For example, one driver's metadata may show a given slice as allocated to one user object hosted by the data storage system, whereas another driver's metadata may show the same slice as allocated to another user object. Software engineers have developed metadata recovery tools to address metadata corruption. Such tools check slice allocation metadata for consistency and attempt to repair errors.

SUMMARY

Conventional metadata recovery tools run in the kernel of a storage processor's operating system. Unfortunately, however, conventional recovery tools can sometimes encounter corrupted metadata that cause them to crash. When recovery tools running in the kernel crash, they can cause a system panic, which requires the storage processor to be rebooted. Even when no crash occurs, conventional recovery tools can sometimes make metadata changes that cause a LUN to unexpectedly go offline. As the recovery tool attempts to repair metadata for one LUN, corruption can inadvertently spread to other LUNs served from the same pool, or to the entire pool, causing all the LUNs built upon the pool to go offline. In addition, it is often necessary to take data storage systems offline while the recovery tools run, to avoid changing metadata while users are accessing their data.

Some recovery tools provide a "check-only" mode, in which the recovery tools detect corruption but make no repairs. Such recovery tools provide output in the form of wrapping buffers, however, which must be accessed regularly from user space to avoid loss of output data.

Also, conventional recovery tools generally report results on a per-LUN basis, where the data storage system implements each LUN in the form of a file that belongs to an internal file system. The data storage system maps offsets within such files to offsets within respective LUNs and presents the file-based LUN representations to users via block-based protocols. A typical data storage system may include many such internal file systems for hosting multiple LUNs. Data storage systems may also host other user objects besides LUNs, such as user file systems and vVOLs, with all such user objects hosted in the form of files of internal file systems. Such internal file systems generally include a single file for providing the user object, and may provide additional files for providing snaps or other copies of the user object. Providing diagnostic output on a per-LUN basis, or even on a per-user-object basis, can conceal slice allocation metadata corruption that spans different user objects, however. Thus, for example, it may be difficult to detect corruption using conventional recovery tools when different metadata indicate that the same slice is allocated to two different user objects.

In contrast with prior recovery tools, an improved technique for verifying the consistency of slice allocation metadata includes accessing, from user space of an operating system running on a data storage apparatus, a set of drivers running in kernel space of the operating system to obtain slice allocation metadata from the set of drivers, and identifying discrepancies in slice allocation metadata returned from the set of drivers on a per-file-system basis. A recovery tool according to this technique may be implemented in user space, where system panics are avoided, even if software errors occur. Providing the recovery tool in user space also avoids the urgency of obtaining output data from wrapping buffers, as output data may be obtained as needed and stored persistently in user space files. Further, providing output data on a per-file-system basis, rather than on a per-LUN or per-user-object basis, facilitates recognition of inconsistencies in slice allocation metadata between user objects and between file systems, thus improving diagnostic ability.

Certain embodiments are directed to a method of verifying the consistency of slice allocation metadata in a data storage apparatus. The method includes accessing, from userspace of an operating system, a set of drivers running in kernel space of the operating system to obtain a first set of slice allocation metadata. The first set of slice allocation metadata describes, for each of a first set of storage slices of the data storage apparatus, an identifier of any file system to which the slice has been allocated. The method further includes accessing, from userspace of the operating system, the set of drivers running in kernel space of the operating system to obtain a second set of slice allocation metadata. The second set of slice allocation metadata describes, for each of a second set of storage slices of the data storage apparatus, an identifier of a file system to which the slice has been allocated. The method still further includes, for each file system to which the storage slices described in the first set of slice allocation metadata have been allocated, (1) identifying discrepancies between (a) slice allocation metadata identifying the file system in the first set of slice allocation metadata and (b) slice allocation metadata identifying the same file system in the second set of slice allocation metadata and (2) storing diagnostic information describing the discrepancies in a diagnostic file.

Other embodiments are directed to computerized apparatus and computer program products. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodi

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for verifying the consistency of slice allocation metadata includes accessing, from user space of an operating system running on the data storage apparatus, a set of drivers running in kernel space of the operating system to obtain slice allocation metadata from the set of drivers, and identifying discrepancies in slice allocation metadata returned from the set of drivers on a per-file-system basis.

Figure 1:
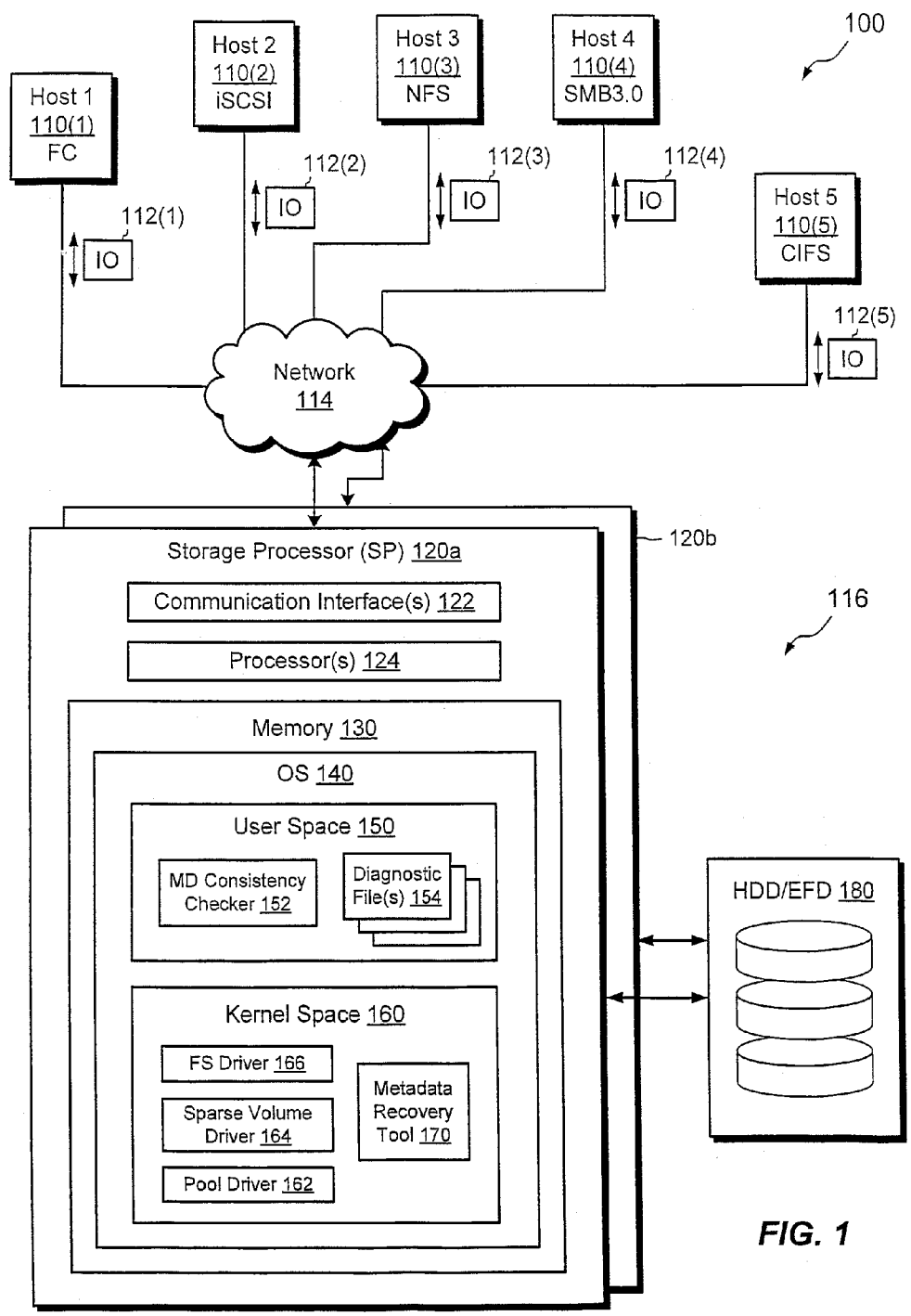
- FIG. 1 is a block diagram of an example environment in which embodiments of the invention hereof can be practiced.

FIG. 1 shows an example environment 100 in which embodiments of the improved technique hereof can be practiced. Here, multiple host computing devices ("hosts") 110(1) through 110(5) access a data storage apparatus 116 over a network 114. The data storage apparatus 116 includes first and second storage processors, or "SPs," 120a and 120b and a set of storage devices 180. The set of storage devices 180 include, for example, hard disk drives, electronic flash drives, solid state drives, and/or other types of storage devices. The SPs 120a and 120b may be provided as circuit board assemblies, or "blades," which plug into a chassis that encloses and cools the SPs. The chassis has a backplane or midplane for interconnecting the SPs, and additional connections may be made among SPs using cables. It is understood, however, that no particular hardware configuration is required, as any number of SPs (including a single one) can be provided and the SPs 120a and 120b can each be any type of computing device capable of communicating with hosts 110(1-5). In an example, the SPs 120a and 120b are configured in a similar manner; however, this is not required.

The network 114 can be any type of network or combination of networks, such as a storage area network (SAN), local area network (LAN), wide area network (WAN), the Internet, and/or some other type of network or combination of networks. The hosts 110(1-5) connect to the SP 120 using various technologies, such as Fibre Channel, iSCSI, NFS (Network File System), SMB 3.0 (Server Message Block), and/or CIFS (Common Internet File System), for example. Any number of hosts may be provided, using any of the above protocols, some subset thereof, or other protocols besides those shown. As is known, Fibre Channel and iSCSI are block-based protocols, whereas NFS, SMB 3.0, and CIFS are file-based protocols. The SPs 120a and 120b are configured to receive requests 112(1-5) according to the respective protocols and to respond to such requests 112(1-5). For example, the SPs 120a and 120b may respond to file-based requests by performing file-based operations on user file systems, file-based vVOLs (virtual volumes), and/or other file-based objects. Also, the SPs 120a and 120b may respond to block-based requests by performing block-based operations on user LUNs, block-based vVOLs, and/or other block-based data objects.

The SP 120a is seen to include one or more communication interfaces 122, a set of processing units 124, and memory 130. The communication interfaces 122 include, for example, network interface adapters and SCSI adapters, for converting electronic and/or optical signals received from the network 114 to electronic form for use by the SP 120a. The set of processing units 124 includes one or more processing chips and/or assemblies. In a particular example, the set of processing units 124 includes multiple CPU cores. The memory 130 includes both volatile memory (e.g., RAM), and non-volatile memory, such as one or more ROMs, disk drives, solid state drives (SSDs), and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are made to carry out the operations of the software constructs. Although certain software constructs are specifically shown and described, it is understood that the memory 130 typically includes many other software constructs, which are not shown, such as various applications, processes, and daemons.

As further shown in FIG. 1, the memory 130 includes an operating system 140 having both a user space 150 and a kernel space 160. In an example, the operating system 140 is the Microsoft Windows™ operating system; however, other operating systems that provide a user space 150 and a kernel space 160 may also be used, such as Unix and Red Hat Linux, for example.

A metadata consistency checker 152 runs within user space 150 and generates one or more diagnostic files 154 describing discrepancies in slice allocation metadata. Multiple drivers run within kernel space 160, including a pool driver 162, a sparse volume driver 164, and a file system driver 166. The pool driver 162 manages the allocation of storage slices from one or more storage pools of the data storage apparatus 116. In some implementations, the pool manager 162 may be provided as a mapped LUN, or "MLU" driver, such as may be include, for example, in CLARiiON data storage systems available from EMC Corporation of Hopkinton, Mass. The sparse volume driver 164 manages the arrangement of storage slices within one or more sparse volumes. As is known, sparse volumes are logical storage volumes having large addressable spaces into which storage slices are provisioned sparsely and generally on demand, i.e., in accordance with a thin provisioning model. The file system driver 166 manages one or more file systems and tracks the arrangements of storage slices within each file system. The file systems may be internal file systems, which store user objects, such as LUNs, user file systems, vVOLs, and so forth, realized in the form of respective files. Alternatively, the file systems may themselves be user file systems that are directly accessible to hosts for storing user data. Kernel space 160 may also include a metadata recovery tool 170, which may be run to repair metadata corruption. In an example, the metadata recovery tool 170 is similar to conventional recovery tools described above.

The pool driver 162, sparse volume driver 164, and file system driver 166 each maintain their own respective slice allocation metadata and thus each possess their own respective views of slice allocation. Ideally, the different views of slice allocation metadata from the drivers 162, 164, and 166 are all consistent with one another. Metadata may sometimes become corrupted, however, causing the views from the different drivers to differ. In an example, the metadata consistency checker 152 performs read-only accesses of slice allocation metadata from each of the drivers 162, 164, and 166, checks the metadata for consistency, and outputs diagnostic information in the diagnostic file(s) 154. System administrators may examine the diagnostic file(s) 154 and decide whether to run the kernel-based metadata recovery tool 170 to repair corrupted metadata, to repair corruption manually, or to take other measures.

Figure 2:
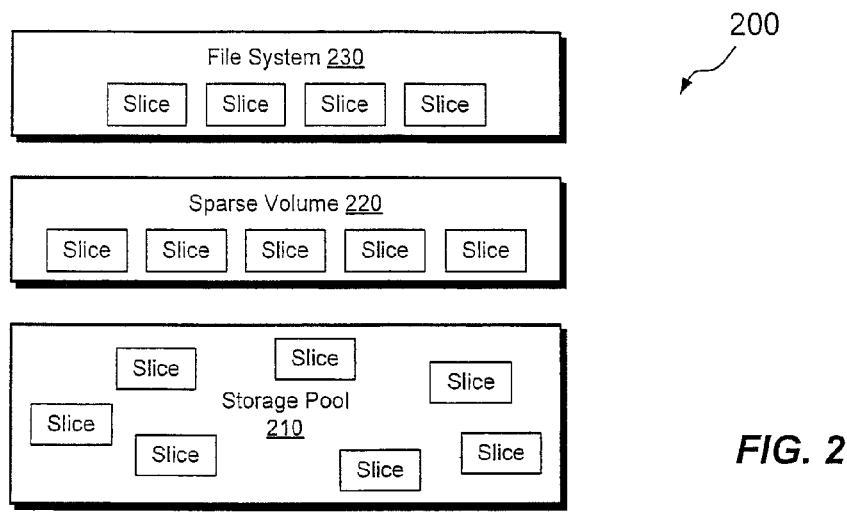
FIG. 2 is a block diagram showing an example stack of storage constructs showing slice allocation from a storage pool to a sparse volume and to a file system.

FIG. 2 shows an example software stack 200 of storage constructs maintained within kernel space 160. These include a storage pool 210, a sparse volume 220, and a file system 230. The pool driver 162 manages the storage pool 210, whereas the sparse volume driver 164 manages the sparse volume 220. The file system driver 166 manages the file system 230. The storage pool 210 is seen to include storage slices. The slices may be allocated or free. Slices from the pool 210 may be allocated to the file system 230 and arranged within the sparse volume 220. Slices in the sparse volume 220 are linked together in a particular sequence but are typically located at non-contiguous logical positions.

It should be understood that the view of FIG. 2 is highly simplified. For example, the pool driver 162 may support any number of storage pools 210. Also, each storage pool 210 may allocate storage slices to any number of file systems 230 via respective sparse volumes 220. In an example, one and only one sparse volume 220 is provided for each file system 230, such that each sparse volume 220 provides an underlying volume upon which a respective file system 230 is constructed.

Figure 3:
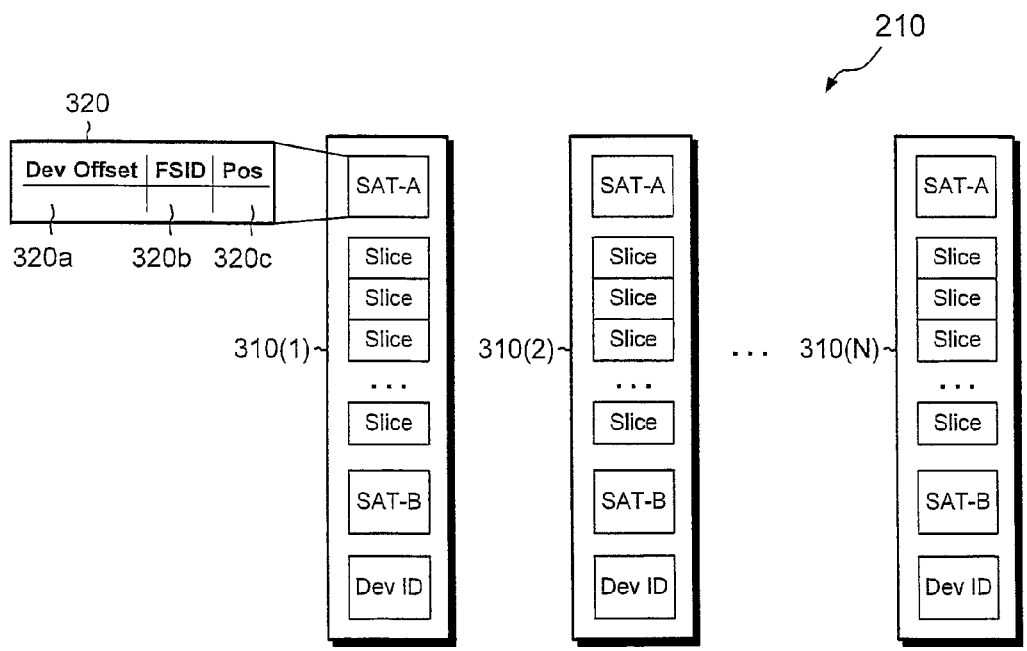
FIG. 3 is a block diagram showing portions of the storage pool of FIG. 2 in additional detail and showing example slice allocation metadata from a viewpoint of a pool driver.

FIG. 3 shows example constituents of a storage pool 210 in greater detail. Here, it is seen that the storage pool 210 provides slices in different groups. In an example, the groups are realized in the form of respective internal LUNs 310(1) to 310(N). Examples of internal LUNs include Flare LUNs, which are known components of CLARiiON storage systems available from EMC Corporation of Hopkinton, Mass.

In an example, each of the internal LUNs 310(1-N) is derived from a RAID group (RAID stands for Redundant Array of Independent Disks) of physical storage devices provided in the storage 180. Each of the internal LUNs 310(1-N) may be provided as a stripe taken across a RAID group (or in some other manner), and each of the storage slices may be derived from an internal LUN, e.g., as a particular offset range within an internal LUN. It is understood that the pool 210 may include any number of internal LUNs 310(1-N) and that each of the internal LUNs 310(1-N) may provide any number of storage slices. As shown, each of the internal LUNs 310(1-N) also includes a device identifier (Dev ID), which uniquely identifies the internal LUN, and a pair of slice allocation tables (SAT-A and SAT-B).

The slice allocation tables SAT-A and SAT-B store slice allocation metadata from the perspective of the pool driver 162. Also, SAT-A stores slice allocation metadata as maintained by the first SP 120a whereas SAT-B stores slice allocation metadata as maintained by the second SP 120b. The metadata from the two SPs 120a and 120b are normally the same but may differ in response to particular activities performed on the SPs.

Table 320 shows an example organization of a slice allocation table (SAT-A) for the internal LUN 310(1). The organization shown is the same across the slice allocation tables for all internal LUNs 310(1-N) and for both SAT-A and SAT-B. In the example, the table 320 includes a field 320a for device offset, a field 320b for file system identifier (FSID), and a field 320c for position (Pos). The table 320 also includes different rows (implied but not shown), one for each slice served by the respective internal LUN. For example, if the internal LUN 320(1) provides 50 storage slices, the table 320 includes 50 rows, one for each slice. It should be understood that the terms "fields" and "rows" describe logical constructs and that the slice allocation tables may be implemented in any suitable way.

For each slice listed in a row of the table 320, a value in the device offset field 320a indicates an offset within the respective internal LUN (e.g., 310(1)) where the slice can be found. Thus, device offsets listed in field 320a of the table 320 indicate locations of slices relative to the current internal LUN. The FSID field 320b identifies a file system, if any, to which the listed slice has been allocated. This value may be empty if the listed slice has not been allocated to any file system. The position field 320c identifies a logical position of the listed slice within the sparse volume 220 provided in connection with the designated FSID. In an example, each file system 230 designated by an FSID is built upon one and only one sparse volume 220. If the listed slice has not been allocated to any file system (i.e., if the FSID field 320b is empty), the position field 320c is also typically empty. As indicated, the slice allocation tables SAT-A and SAT-B together provide a view of slice allocation metadata from the perspective of the pool driver 162; however, other metadata provide additional views for other drivers.

Figure 4:
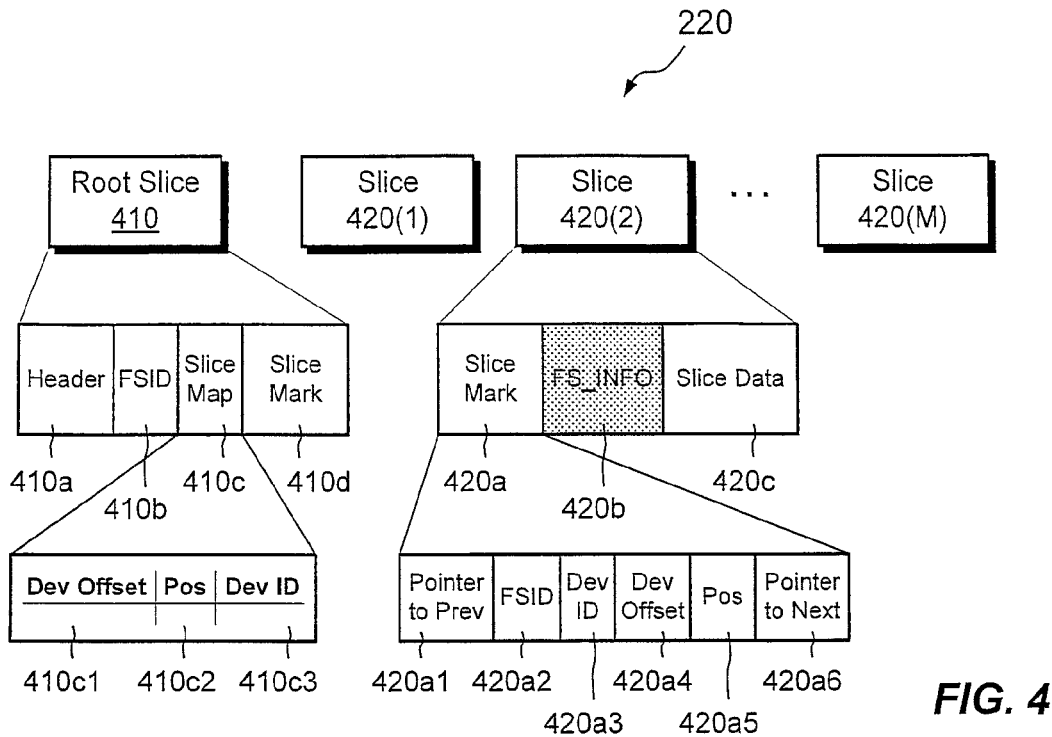
FIG. 4 is a block diagram showing example slice allocation metadata from a viewpoint of a sparse volume driver.

FIG. 4 shows example portions of the sparse volume 220 in greater detail, and illustrates slice allocation metadata from the perspective of the sparse volume driver 164. Here, slices 410 and 420(1)-420(M) have been allocated to a file system 230 built upon the sparse volume 220. The slice 410 has been designated as a "root slice," whereas the slices 420(1-M) are designated for storing file system data as well as file system metadata (e.g., inodes, directories, etc.).

The root slice 410 stores metadata describing the organization of the sparse volume 220. Such metadata includes, for example, a root slice header 410a, a file system identifier (FSID) 410b, a slice map 410c, and a slice mark 410d. The FSID 410b identifies the file system 230 built upon the sparse volume 220 and normally should match the value stored in the FSID field 320b of the slice allocation table (FIG. 3) for the slice allocated for the root slice 410. In an example, the root slice 410 is allocated to a predetermined position within the sparse volume 220 (e.g., −2). The slice map 410c lists information (e.g., in "rows") about each of the slices 420(1-M) allocated to the sparse volume 220. This information includes, for each slice, a device offset 410c1, a position 410c2, and a device identifier 410c3. In some examples, the slice map 410 is organized as an array and the position 410c2 may be expressed as an index into an array, which corresponds to a position. The device offset 410c1 and position listed for the slice should normally match the device offset and position listed in fields 320a and 320 (FIG. 3), respectively, of the slice allocation table for the respective slices. The device ID 410c3 should generally match the device ID (Dev ID) of the internal LUN (FIG. 3) from which each respective slice is derived. The slice map 410c thus lists the internal LUN (one of 310(1-N)—see FIG. 3) and location within the internal LUN from which each slice of the sparse volume 220 is derived, as well as the logical position of the slice within the sparse volume 220.

Each of the slices 420(1-M) includes a slice mark 420a, file system information (FS_INFO) 420b, and slice data 420c (e.g., user data and/or metadata used by the file system 230). Although only the components of slice 420(2) are shown, it should be understood that all slices 420(1-M) may be similarly arranged. A representative block for FS_INFO 420b is shaded to indicate that, although the FS_INFO is included in the slices 420(1-M), it is not managed by the sparse volume driver 164 and thus does not constitute part of the view of slice allocation metadata by the sparse volume driver 164. It should be understood that different implementations may store different metadata. For example, the FS_INFO may be included in the slice mark 420a in some implementations but not in others.

The slice mark 420a is itself seen to include a pointer 420a1 to a previous slice in the sparse volume 220 and a pointer 420a6 to a next slice in the sparse volume 220. The pointers 420a1 and 420a6 thus arrange the slices 410(1-M) in a doubly-linked list. Because the sparse volume 220 is only sparsely populated with slices, slices are not generally contiguous. When operation is consistent, the pointers 420a1 and 420a6 of the slices 420(1-M) provide information which is redundant with the slice position information 410c2 stored in the slice map 410c and with the slice position information 320c stored in the slice allocation table (FIG. 3). The slice mark 420a is further seen to include:

An FSID 420a2, which identifies the file system 230 to which the slice is allocated and normally matches FSID 410b and FSID 320b (FIG. 3);

A device identifier 420a3, which identifies the internal LUN from which the slice is derived and normally matches the device ID 410c3 and the Dev ID of the internal LUN (FIG. 3);

A device offset 420a4, which identifies an offset within an internal LUN (FIG. 3) where from which the slice is derived and normally matches the device offset 410c1 in the slice map 410c and the device offset 320a in the slice allocation table 320; and A position 420a5, which identifies the logical position of the slice within the sparse volume 220 and which normally matches the position 410c2 in the slice map 410c and the position 320c within the slice allocation table 320 (FIG. 3).

The slices 420(1-M) and the slice map 410c thus include redundant slice allocation metadata that provide the sparse volume driver 164 with its own view of slice allocation. In an example, the slice mark 410d of the root slice 410 is arranged in the same way as the slice mark 420a.

Figure 5:
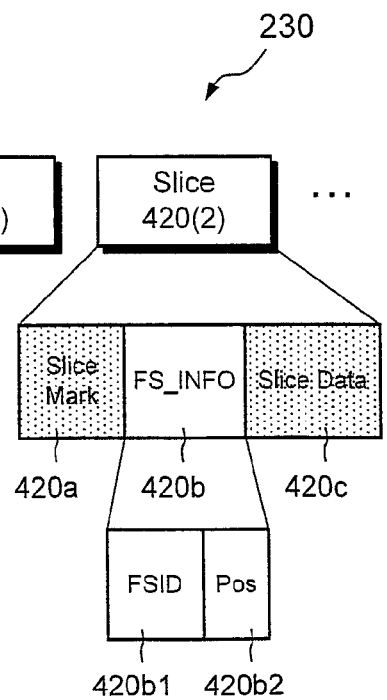
FIG. 5 is a block diagram showing example slice allocation metadata from a viewpoint of a file system driver.

FIG. 5 shows example portions of the file system 230 in greater detail, as well as slice allocation metadata from the perspective of the file system driver 166. Here, it is seen that the same slices 410 and 420(1-M) that form the sparse volume 220 also form the file system 230; however, the root slice 410 as well as portions of the slices 420(1-M) are shaded to indicate that the file system driver 166 does not manage these elements. Rather, the file system driver 166 manages FS_INFO 420b. Although only example constituents of slice 420(2) are shown, it is understood that the illustrated arrangement for slice 420(2) may be common to all slices 420(1-M).

FS_INFO 420b is seen to include an FSID 420b1 and a position 420b2. The FSID 420b1 identifies the file system 230 to which the slice is allocated, whereas the position 420b2 indicates the logical position of the slice within the sparse volume 220. The FS_INFO 420b thus provides redundant slice allocation metadata that give the file system driver 166 its own view of slice allocation.

As described, the pool driver 162, the sparse volume driver 164, and the file system driver 166 together provide three distinct views of slice allocation metadata. During normal operation, these views remain consistent. However, software and/or hardware errors can corrupt metadata and cause these views to diverge. If not detected, corrupted metadata can cause system errors and data loss. To enable detection of corrupted metadata, administrators, other users, and/or software programs can invoke the metadata consistency checker 152 from userspace 150 of the operating system 140 on one of the SPs 120a or 120b.

Figure 6:
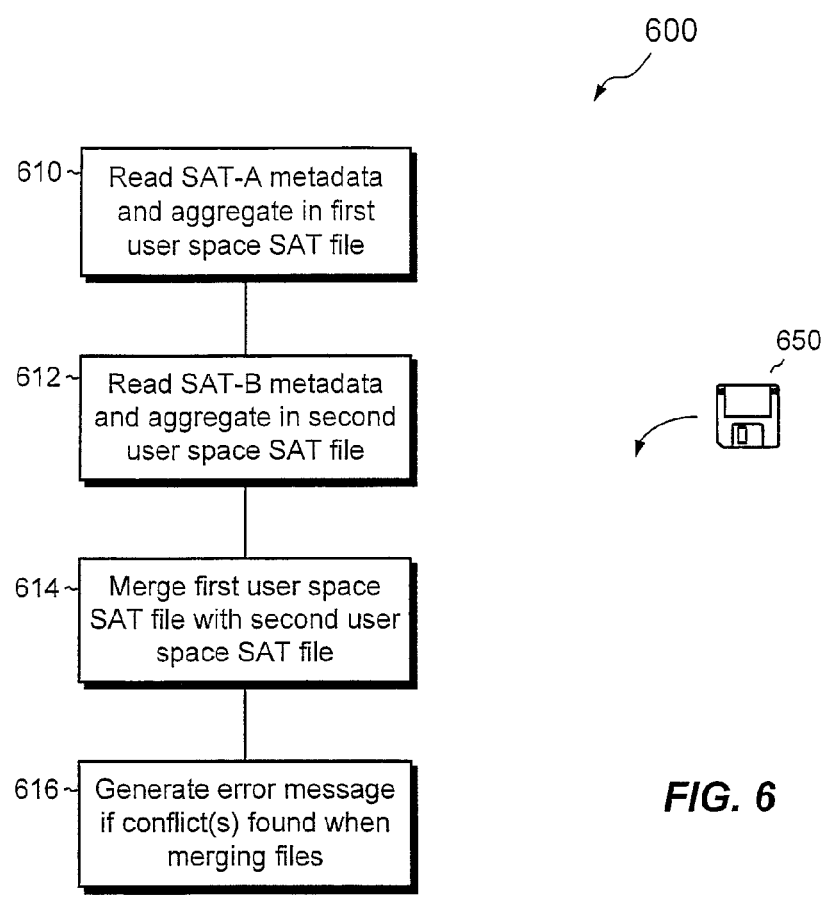
FIG. 6 is a flowchart showing an example process for extracting and merging slice allocation metadata from the pool driver.
Figure 7:
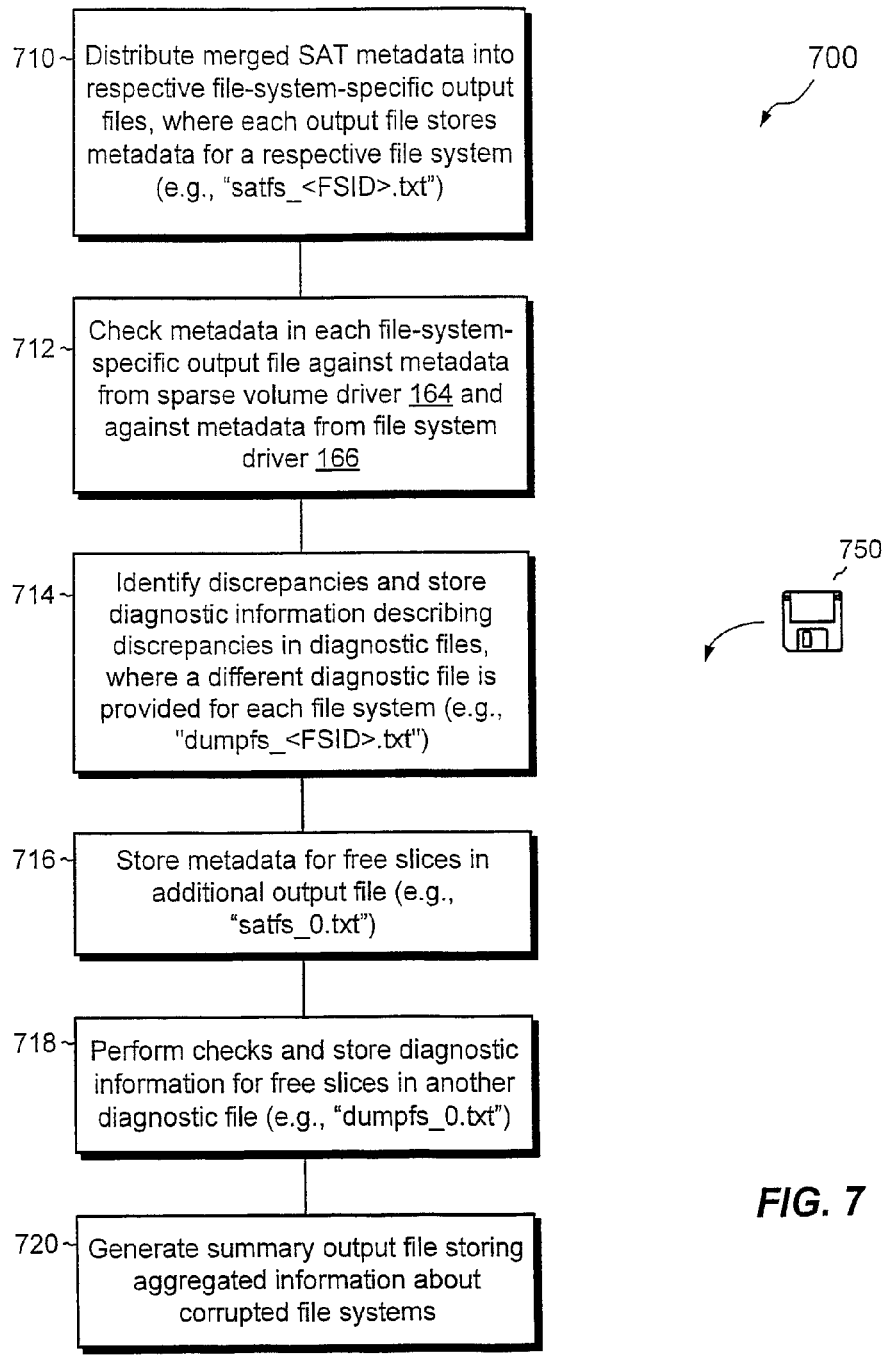
FIG. 7 is a flowchart showing an example process for generating diagnostic output files.
Figure 8:
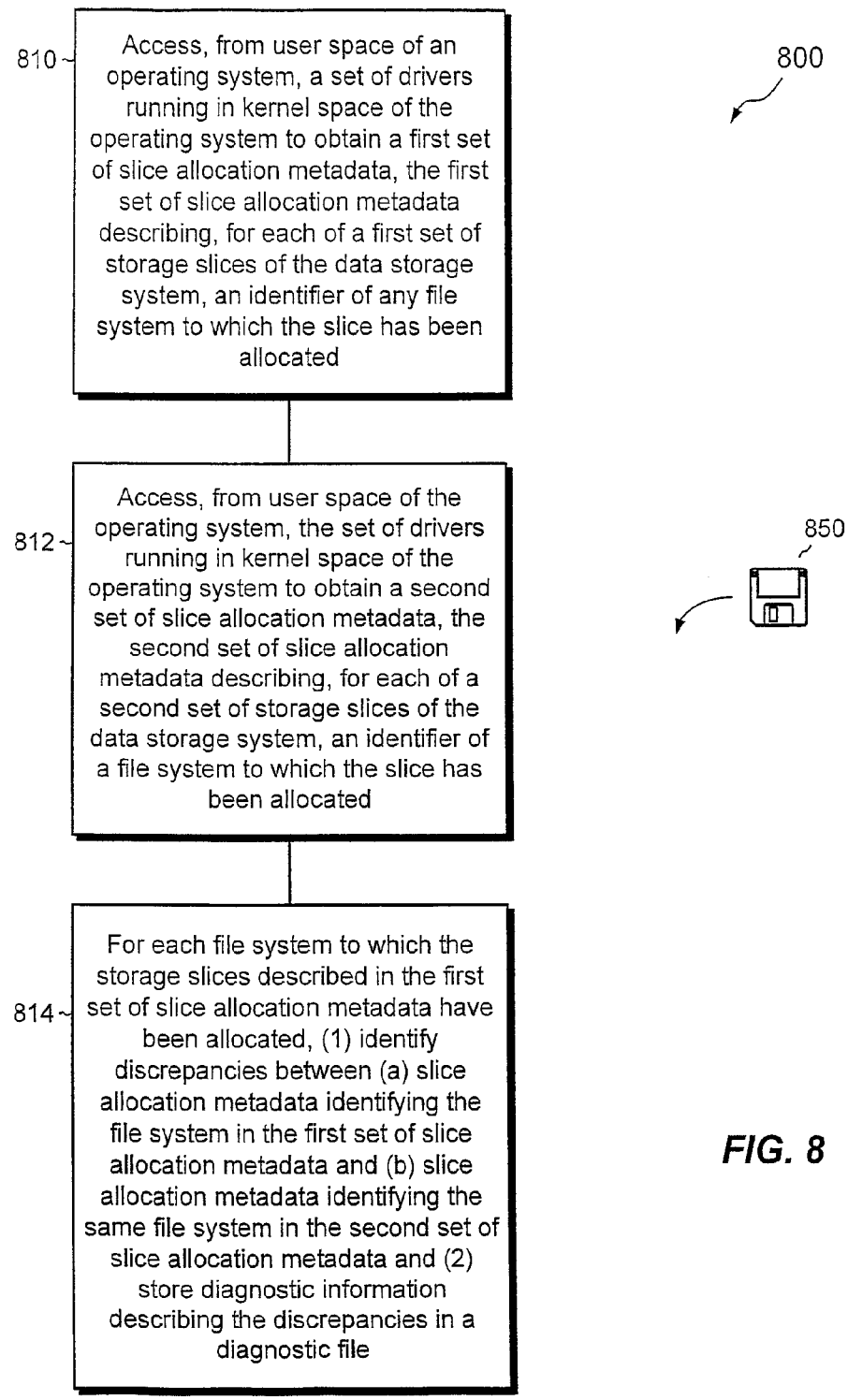
FIG. 8 is a flowchart showing an example process for verifying the consistency of slice allocation metadata across different drivers of a data storage apparatus.

FIGS. 6-8 illustrate processes that may be carried out in connection with the environment 100. These processes are typically performed by the software constructs, described in connection with FIG. 1, which reside in the memory 130 of one or both SPs 120a and 120b and are run by the set of processing units 124. The various acts of each process may be ordered in any suitable way. Accordingly, embodiments may be constructed in which acts are performed in orders different from those illustrated, which may include performing some acts simultaneously, even though the acts are shown as sequential in the illustrated embodiments.

FIG. 6 shows an example process 600 for accessing the pool driver 162 (or some other driver) to obtain a first set of slice allocation metadata. In an example, the process 600 is performed by the metadata consistency checker 152. Alternatively, the process 600 is performed by other software constructs that operate in coordination with the metadata consistency checker 152 or by a combination of the metadata consistency checker 152 and other software constructs.

At step 610, the tables 320 for SAT-A are read for the internal LUNs 310(1-N) and the information in the tables is aggregated to form a view of slice allocation as seen by the first SP 120a. For example, the metadata consistency checker 152 performs read operations to the kernel 160 to obtain the SAT-A data for the internal LUNs 310(1-N). The metadata consistency checker 152 receives the data in user space 150. The metadata consistency checker 152 may then create a new slice allocation table that includes an additional Device Identifier (Dev ID) field and all the information from the tables 320 for all the internal LUNs 310(1-N) in the newly created table, with each row of the table designating a particular slice and having a value for Dev ID. The metadata consistency checker 152 then stores the aggregated table for SAT-A in a first SAT file (e.g., one of the diagnostic files 154) in user space 150.

At step 612, the metadata consistency checker 152 performs similar acts as described for step 610, but aggregates SAT-B tables to create a view of slice allocation as seen by the second SP 120b. The metadata consistency checker 152 stores the aggregated table for SAT-B in a second SAT file (e.g., one of the diagnostic files 154) in user space 150.

At step 614, the metadata consistency checker 152 merges the first SAT file with the second SAT file to generate a merged SAT. The metadata consistency checker 152 may store the merged SAT in a third SAT file in user space 150.

In an example, the metadata consistency checker 152 merges the first and second SAT files by examining each slice of the pool 210 to verify that the device ID, device offset 320a, FSID 320b, and position 320c as reported in the first file match the corresponding values in the second file. If the values match, the information for the slice may be provided to the merged SAT. Certain inconsistencies are allowed. For example, if the file for SAT-A shows a slice as being allocated to a file system but the file for SAT-B shows the slice as being free, then other metadata may be consulted and the slice may be listed in the merged file as either allocated to the file system or free, depending on the other metadata. Other inconsistencies may be forbidden, however. For example, if the file for SAT-A shows a slice allocated to one file systems whereas the file for SAT-B shows the same slice allocated to a different file system, then the metadata consistency checker 152 generates an error message (step 616) to report a conflict. At the conclusion of the process 600, and assuming no conflicts are found, the merged SAT provides a set of slice allocation metadata that is consistent between the SPs 120a and 120b and represents the view of slice allocation metadata from the perspective of the pool driver 162.

In an example, software constructs other than the metadata consistency checker 152 perform steps 610 and 612 to produce the first SAT file and the second SAT file. Steps 610 and 612 may be performed automatically, e.g., on a regular basis or in response to certain events. The metadata consistency checker 152 performs steps 614 and 616 once the first and second SAT files have been created. Also, steps 614 and 616 may be performed in response to a command entered by an administrator or other user from a command line interface or other user interface in user space 150.

FIG. 7 shows an example process 700 for checking slice allocation consistency and generating one or more diagnostic output files. The diagnostic output files may be included among the files 154. In an example, the metadata consistency checker 152 performs the acts of the process 700.

At step 710, slice allocation metadata from the merged SAT (e.g., as generated at step 614 of FIG. 6) are distributed to respective file-system-specific output files, such that each output file stores slice allocation metadata for a respective file system. For convenience, the file names for the file-system-specific output files may include the FSID of the file system, with such names represented, for example, in the form "satfs_<FSID>.txt." In an example, a different satfs_<FSID>.txt file is created for each unique FSID represented in the merged SAT.

To generate the file-system-specific output files, the metadata consistency checker 152 identifies each slice in the merged SAT, identifies the FSID 320b associated with the respective slice, and stores SAT metadata for that slice (e.g., device ID, device offset 320a, and position 320c) in the respective "satfs_<FSID>.txt" output file.

At step 712, slice allocation metadata in each file-system-specific output file are checked against slice allocation metadata obtained from the sparse volume driver 164 and from the file system driver 166 (or from some other driver(s)). Thus, the different views of slice allocation metadata from the drivers 162, 164, and 166 are checked for consistency. Discrepancies are identified and stored in diagnostic files (step 714), such as among the files 154. In an example, the diagnostic files are also organized on a per-file-system basis, and may be named, for example, according to a convention such as "dumpfs_<FSID>.txt."

The metadata consistency checker 152 may perform many checks. For example, if no root slice 410 (FIG. 4) for a file system can be found in the merged SAT (e.g., if no slice having a position 320c of −2 is present) the metadata consistency checker 152 generates a failure message. In addition, various checks are performed on a per-slice basis for each file system. For example, for each slice:

- The metadata consistency checker 152 reads the slice mark 420a for the slice and verifies that the metadata it contains matches the metadata stored for that slice in the slice map 410c;
- The metadata consistency checker 152 verifies that the metadata in the slice mark 420 and the metadata in the slice map 410c for that slice both match the metadata for that slice in the merged SAT (e.g., in the respective satfs_<FSID>.txt file);
- The metadata consistency checker 152 reads the slice's FS_INFO 420b and verifies that the metadata it contains matches the metadata for that slice in the slice map 410c, in the slice mark 420a, and in the satfs_<FSID>.txt file.

In an example, the metadata consistency checker 152 reads the slice map 410a and the slice mark 420a by issuing read-only requests to the sparse volume driver 164 in the kernel 160. Also, the metadata consistency checker 152 reads the FS_INFO 420b by issuing read-only requests to the file system driver 166. Alternatively, the metadata consistency checker 152 obtains slice map, slice mark, and FS_INFO metadata directly from the underlying internal LUN (one of 310(1-N)) using the pool driver 162 or some other driver. All such metadata are ultimately stored on underlying storage devices, which may be accessed in a variety of ways.

The metadata consistency checker 152 dumps any errors or detected discrepancies to the "dumpfs_<FSID>.txt" file for the file system currently being checked. For example, the entry for the slice in the slice map 410c, the slice mark 420a, and any other relevant metadata for the slice for which a discrepancy is found are dumped to the diagnostic file. In an example, the metadata consistency checker 152 maintains a live count of the number of corrupted slices found when checking any file system. If the number of corrupted slices exceeds a predetermined number (e.g., 1000), verification of the file system may be aborted and the metadata consistency checker 152 may alert the system administrator or other user that a file system restore operation is recommended.

At step 716, slice allocation metadata for free slices are stored in an additional output file. For example, the metadata consistency checker 152 identifies any free slices in the merged SAT (e.g., those having empty FSID values in the field 320) and stores their SAT metadata (e.g., device ID, device offset 320a, and position 320c) in an output file. The output file may conventionally be named "satfs_0.txt," for example.

At step 718, checks are performed on free slices. For example, the metadata consistency checker 152 checks each free slice to verify that the slice mark 420 for the slice is clean (e.g., that it contains all zeros). If the slice mark 420 for the slice is not clean, the slice may be corrupted and the slice mark 420 is dumped to another diagnostic file (e.g., named "dumpfs_0.txt," for example).

At step 720, a summary output file is generated. The summary output file (e.g., named "corrupt_result.txt") provides aggregated information about corrupted file systems. For example, the summary output file lists, for each file system, the kinds of corruption found and the number of occurrences of each kind of corruption found. Kinds of corruption include (a) corrupted entries in the slice map 410c, (b) corrupted slice marks 420a, (c) and corrupted links (pointers 420a1 and 420a6) between slice marks 420a, for example. Unlike the "dumpfs_<FSID>.txt" files, which provide diagnostic information about individual file systems, the summary output file provides information pertaining to multiple file systems. Thus, the summary output file furnishes an additional view of slice corruption that extends across different file systems and thus allows identification of corruption that might otherwise be difficult to detect.

In an example, an administrator or other user logged onto the SP 120*a* or the SP 120*b* enters a command (e.g., a "recovery check command") on a user interface to run the metadata consistency checker 152. The recovery check command may specify a name or identifier of a storage pool on which consistency checking is to be performed. The metadata consistency checker 152 may then perform consistency checking on all file systems served by the designated pool. Alternatively, the recovery check command accepts one or more parameters for an FSID, or a group of FSIDs, and directs the metadata consistency checker 152 to perform consistency checking on only the file system(s) specified in the recovery check command. Running the metadata consistency checker 152 on particular file systems may be less effective, however, than running the metadata consistency checker 152 on all file systems for a designated pool, because corruption affecting one file system in a pool also tends to affect other file systems in the same pool. Thus, it is generally best to check all file systems in a given pool. In some examples, other software constructs generate the files for SAT-A and SAT-B (FIG. 6) in advance of an administrator running the metadata consistency checker 152, and file names of the SAT-A and SAT-B files are provided as input with the recovery check command. In some examples, the recovery check command accepts an FSID parameter for finding and checking orphan slices in the designated FSID. "Orphan slices" are slices listed in the slice map 410*c* of the root slice 410 associated with the FSID for which no entries appear in the merged SAT (FIG. 6) or in any of the satfs_<FSID>.txt files. In an example, if the recovery check command includes no FSID designation for checking orphan slices, no orphan slices will be checked. If the FSID parameter is set to "0," the recovery check command will direct the metadata consistency checker 152 to check find and check orphan slices for all file systems in the designated pool.

FIG. 8 shows an example process 800 for verifying the consistency of slice allocation metadata of a data storage system and summarized much of the description above.

At step 810, a set of drivers running in kernel space of an operating system is/are accessed from user space of the operating system to obtain a first set of slice allocation metadata. The first set of slice allocation metadata describes, for each of a first set of storage slices of the data storage system, an identifier of any file system to which the slice has been allocated. For example, the metadata consistency checker 152 (or some other software construct running in user space 150) accesses the pool driver 162 running in kernel space 160 to obtain slice allocation metadata from the slice allocation tables 320 provided in connection with the internal LUNs 310(1-N). The tables 320 include FSID information. In one example, the first set of slices include all the slices in a pool. In another example, the first set of storage slices are the slices allocated to a particular file system or group of file systems, e.g., as may be specified according to some variants in the recovery check command entered for running the metadata consistency checker 152.

At step 812, the set of drivers running in kernel space of the operating system is/are accessed from user space of the operating system to obtain a second set of slice allocation metadata. The second set of slice allocation metadata describes, for each of a second set of storage slices of the data storage system, an identifier of any file system to which the slice has been allocated. For example, the metadata consistency checker 152 accesses the sparse volume driver 164 running in kernel space 160 to obtain slice allocation metadata stored in a root slice 410 and slice mark 420 associated with each file system specified in the recovery check command. The root slice 410 and slice mark 420 include FSID information. Alternatively, the metadata consistency checker 152 accesses the pool driver 162 or some other driver to obtain the desired metadata. In an example, the second set of storage slices include the slices of the first set of storage slices (e.g., those identified in step 810) which are also found in the root slice(s) 410 of the file systems designated in the recovery check command. When metadata are consistent, the second set of storage slices is the same as the first set of storage slices, i.e., the sets completely intersect. When slices are corrupted, however, the second set of storage slices may differ from the first set of storage slices.

At step 814, for each file system to which the storage slices described in the first set of slice allocation metadata have been allocated, (1) discrepancies are identified between (a) slice allocation metadata identifying the file system in the first set of slice allocation metadata and (b) slice allocation metadata identifying the same file system in the second set of slice allocation metadata and (2) diagnostic information describing the discrepancies are stored in a diagnostic file. For example, the metadata consistency checker 152 compares slice allocation metadata stored in each satfs_<FSID>.txt file specified in the recovery check command with slice allocation metadata obtained from the root slices 410 and slice marks 420. The metadata consistency checker 152 identifies any discrepancies in metadata among these sources and stores diagnostic information in a diagnostic file, such as a different dumpfs_<FSID>.txt diagnostic file for each file system.

An improved technique has been described for verifying the consistency of slice allocation metadata. The technique includes accessing, from user space 150 of an operating system 140 running on the data storage apparatus 116, a set of drivers (e.g., any of 162, 164, and 166) running in kernel space 160 of the operating system 140 to obtain slice allocation metadata from the set of drivers, and identifying discrepancies in slice allocation metadata returned from the set of drivers on a per-file-system basis. A metadata consistency checker 152 according to this technique may be implemented in user space 150, where system panics are avoided, even if software errors occur. Providing the metadata consistency checker 152 in user space also avoids the urgency of obtaining output data from wrapping buffers, as output data may be obtained as needed and stored persistently in user space files. The read-only operation of the metadata consistency checker 152 avoids spreading corruption from one LUN to another in a pool by trying to repair corruption. Further, providing output data on a per-file-system basis, rather than on a per-LUN or per-user-object basis, facilitates recognition of inconsistencies in slice allocation metadata within and between file systems, thus improving diagnostic ability.

Having described certain embodiments, numerous alternative embodiments or variations can be made. For example, although the metadata consistency checker 152 may be used in place of prior kernel-based recovery tools (such as the tool 170 of FIG. 1), nothing precludes the metadata consistency checker 152 and the metadata recovery tool 170 from being used together. For example, administrators can run the metadata consistency checker 152 to perform a read-only and non-disruptive verification of slice allocation metadata and then examine the summary file (e.g., the "corrupt_result.txt" file) to determine the kinds of corruption present. If the metadata recovery tool 170 is known to crash only when it encounters certain kinds of corruption, the administrator may search the corrupt_result.txt file for those kinds of corruption. If none are found, the administrator may run the metadata recovery tool 170 to repair the corrupted metadata automatically. However, if searching the corrupt_result.txt file reveals the presence of corruption known to crash the metadata recovery tool 170, the administrator may instead choose to repair the metadata manually or to perform a file system restore operation.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as media 650, 750, and 850 in FIGS. 6, 7, and 8). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of verifying the consistency of slice allocation metadata in a data storage apparatus, the method comprising:
   accessing, from userspace of an operating system, a set of drivers running in kernel space of the operating system to obtain a first set of slice allocation metadata, the first set of slice allocation metadata describing, for each of a first set of storage slices of the data storage apparatus, an identifier of any file system to which the slice has been allocated;
   accessing, from userspace of the operating system, the set of drivers running in kernel space of the operating system to obtain a second set of slice allocation metadata, the second set of slice allocation metadata describing, for each of a second set of storage slices of the data storage apparatus, an identifier of a file system to which the slice has been allocated; and
   for each file system to which the storage slices described in the first set of slice allocation metadata have been allocated, (1) identifying discrepancies between (a) slice allocation metadata identifying the file system in the first set of slice allocation metadata and (b) slice allocation metadata identifying the same file system in the second set of slice allocation metadata and (2) storing diagnostic information describing the discrepancies in a diagnostic file.

2. The method of claim 1,
   wherein the data storage apparatus stores multiple file systems,
   wherein each of the file systems is built upon a respective sparse volume,
   wherein the data storage apparatus includes a first driver that tracks allocations of slices from a storage pool of the data storage apparatus to the file systems, and
   wherein the data storage apparatus includes a second driver that tracks arrangements of slices within the sparse volumes.

3. The method of claim 2, wherein the data storage apparatus includes a first storage processor and a second storage processor, and wherein accessing the set of drivers to obtain the first set of slice allocation metadata includes merging slice allocation metadata obtained from the first storage processor with slice allocation metadata obtained from the second storage processor to generate the first set of slice allocation metadata.

4. The method of claim 3, further comprising:
   identifying a slice allocation conflict when merging slice allocation metadata from the first storage processor with slice allocation metadata from the second storage processor, the slice allocation conflict indicating that a slice is allocated to one file system according to the slice allocation metadata obtained from the first storage processor but that the same slice is allocated to another file system according to the slice allocation metadata obtained from the second storage processor; and
   generating an error message in response to identifying the slice allocation conflict.

5. The method of claim 2, further comprising distributing the first set of slice allocation metadata among a set of output files in user space such that each output file is specific to a respective file system and is made to include slice allocation metadata for slices allocated to the respective file system.

6. The method of claim 5, further comprising:
   identifying a set of free slices described in the first set of slice allocation metadata, wherein free slices are storage slices that the first set of slice allocation metadata describes as not being allocated to any file system; and
   storing slice allocation metadata for all such free slices in another output file.

7. The method of claim 6, wherein storing diagnostic information describing the discrepancies in a diagnostic file includes storing diagnostic information for different file systems in respective diagnostic files, one for each file system.

8. The method of claim 7, further comprising storing diagnostic information for the set of free slices in another diagnostic file.

9. The method of claim 8, further comprising generating summary output that provides aggregated information about corrupted file systems, including kinds of corruption found in each corrupted file system and a number of occurrences of each kind of corruption found in each corrupted file system.

10. The method of claim 2, further comprising generating summary output that identifies slice allocation metadata inconsistencies between different file systems.

11. The method of claim 2, further comprising:
   accessing, from userspace of the operating system, the set of drivers running in kernel space of the operating system to obtain a third set of slice allocation metadata, the third set of slice allocation metadata describing, for each of a third set of storage slices of the data storage apparatus, an identifier of a file system to which the slice has been allocated, wherein the data storage apparatus includes a third driver that tracks allocations of slices in the file systems of the data storage apparatus, and wherein identifying discrepancies operates to identify discrepancies between the first, second, and third sets of slice allocation metadata.

12. The method of claim 11, wherein identifying discrepancies and storing diagnostic information are performed in response to receiving a command to run a program in user space, the command including an identifier of a particular storage pool for which verification of slice allocation metadata consistency is to be performed.

13. The method of claim 12, further comprising, after storing diagnostic information, running a recovery tool in the kernel of the operating system to repair slice allocation metadata errors.

14. A computerized apparatus, comprising:
a set of processors; and
memory, coupled to the set of processors, the memory storing executable instructions, which when executed by the set of processors cause the set of processors to perform a method of verifying the consistency of slice allocation metadata in a data storage apparatus, the method comprising:
  accessing, from userspace of an operating system, a set of drivers running in kernel space of the operating system to obtain a first set of slice allocation metadata, the first set of slice allocation metadata describing, for each of a first set of storage slices of the data storage apparatus, an identifier of any file system to which the slice has been allocated;
  accessing, from userspace of the operating system, the set of drivers running in kernel space of the operating system to obtain a second set of slice allocation metadata, the second set of slice allocation metadata describing, for each of a second set of storage slices of the data storage apparatus, an identifier of a file system to which the slice has been allocated; and
  for each file system to which the storage slices described in the first set of slice allocation metadata have been allocated, (1) identifying discrepancies between (a) slice allocation metadata identifying the file system in the first set of slice allocation metadata and (b) slice allocation metadata identifying the same file system in the second set of slice allocation metadata and (2) storing diagnostic information describing the discrepancies in a diagnostic file.

15. The computerized apparatus of claim 14,
wherein the data storage apparatus stores multiple file systems,
wherein each of the file systems is built upon a respective sparse volume,
wherein the data storage apparatus includes a first driver that tracks allocations of slices from a storage pool of the data storage apparatus to the file systems, and wherein the data storage apparatus includes a second driver that tracks arrangements of slices within the sparse volumes.

16. The computerized apparatus of claim 15, wherein the data storage apparatus includes a first storage processor and a second storage processor, and wherein accessing the set of drivers to obtain the first set of slice allocation metadata includes merging slice allocation metadata obtained from the first storage processor with slice allocation metadata obtained from the second storage processor to generate the first set of slice allocation metadata.

17. A non-transitory computer-readable medium including instructions which, when executed by a set of processors of a computing device, cause the set of processors to perform a method of verifying the consistency of slice allocation metadata in a data storage apparatus, the method comprising:
  accessing, from userspace of an operating system, a set of drivers running in kernel space of the operating system to obtain a first set of slice allocation metadata, the first set of slice allocation metadata describing, for each of a first set of storage slices of the data storage apparatus, an identifier of any file system to which the slice has been allocated;
  accessing, from userspace of the operating system, the set of drivers running in kernel space of the operating system to obtain a second set of slice allocation metadata, the second set of slice allocation metadata describing, for each of a second set of storage slices of the data storage apparatus, an identifier of a file system to which the slice has been allocated; and
  for each file system to which the storage slices described in the first set of slice allocation metadata have been allocated, (1) identifying discrepancies between (a) slice allocation metadata identifying the file system in the first set of slice allocation metadata and (b) slice allocation metadata identifying the same file system in the second set of slice allocation metadata and (2) storing diagnostic information describing the discrepancies in a diagnostic file.

18. The non-transitory computer-readable medium of claim 17, wherein the method further comprises generating summary output that stores aggregated information about corrupted file systems, including kinds of corruption found in each corrupted file system and a number of occurrences of each kind of corruption found in each corrupted file system.

19. The non-transitory computer-readable medium of claim 17, wherein the method further comprises generating summary output that identifies slice allocation metadata inconsistencies between different file systems.

20. The non-transitory computer-readable medium of claim 17, wherein the method further comprises distributing the first set of slice allocation metadata among a set of output files in user space such that each output file is specific to a respective file system and is made to include slice allocation metadata for slices allocated to the respective file system.

\* \* \* \* \*